United States Patent [19]

Yamauchi

[11] Patent Number: 5,668,873
[45] Date of Patent: Sep. 16, 1997

[54] VIDEO SIGNAL PROCESSOR WITH COPY PREVENTION FUNCTION

[75] Inventor: Etsuro Yamauchi, Tokyo, Japan

[73] Assignee: Sony Corporation, Tokyo, Japan

[21] Appl. No.: 404,998

[22] Filed: Mar. 16, 1995

[30] Foreign Application Priority Data

Mar. 27, 1994 [JP] Japan .................................. 6-080892

[51] Int. Cl.⁶ .................................................. H04N 7/167
[52] U.S. Cl. .................................. 380/5; 380/15; 380/20
[58] Field of Search .............................. 380/5, 20, 10,
380/15; 348/5.5; 360/60

[56] References Cited

U.S. PATENT DOCUMENTS

| 3,313,880 | 4/1967 | Bass ............................................ 380/15 |
| 4,510,623 | 4/1985 | Bonneau et al. ......................... 348/5.5 |
| 4,631,603 | 12/1986 | Ryan . |
| 4,695,901 | 9/1987 | Ryan ............................................ 380/5 |
| 4,718,107 | 1/1988 | Hayes ...................................... 455/4.15 |
| 5,053,884 | 10/1991 | Kamijyo ................................... 348/5.5 |
| 5,130,864 | 7/1992 | Shimada .................................. 360/60 |
| 5,157,510 | 10/1992 | Quan et al. ............................ 358/335 |
| 5,182,771 | 1/1993 | Munich et al. ............................. 380/5 |
| 5,315,448 | 5/1994 | Ryan ....................................... 360/60 |
| 5,337,157 | 8/1994 | Nakata .................................. 358/335 |
| 5,418,853 | 5/1995 | Kanota et al. .............................. 380/5 |
| 5,493,339 | 2/1996 | Birch et al. ............................ 348/461 |
| 5,559,549 | 9/1996 | Hendricks et al. ......................... 348/6 |
| 5,574,787 | 11/1996 | Ryan ........................................... 380/5 |

FOREIGN PATENT DOCUMENTS

| 0224929 | 10/1987 | European Pat. Off. . |
| 0580367 | 1/1994 | European Pat. Off. . |
| 8502293 | 5/1985 | WIPO . |

*Primary Examiner*—Thomas H. Tarcza
*Assistant Examiner*—Pinchus M. Laufer
*Attorney, Agent, or Firm*—Jay H. Maioli

[57] ABSTRACT

A video signal processor is capable of executing on/off control of a copy inhibiting process and rendering extremely difficult any illegal cancellation of the copy inhibiting process by a third person. This video signal processor includes an obstructor for obstructing proper recording of a video signal; a memory for storing a specific code inputted when enabling the obstructor, and also for storing a disable request code inputted in response to a request for disabling the obstructor; a judge device for judging the relationship between the value of the specific code and the value of the disable request code outputted from the memory; and a decider for deciding an operation to disable the obstructor in accordance with the output of the judge means. The memory has a plurality of registers, and at least one of the bit components of the specific code and the disable request code is stored dispersedly in the plural registers in the memory.

13 Claims, 7 Drawing Sheets

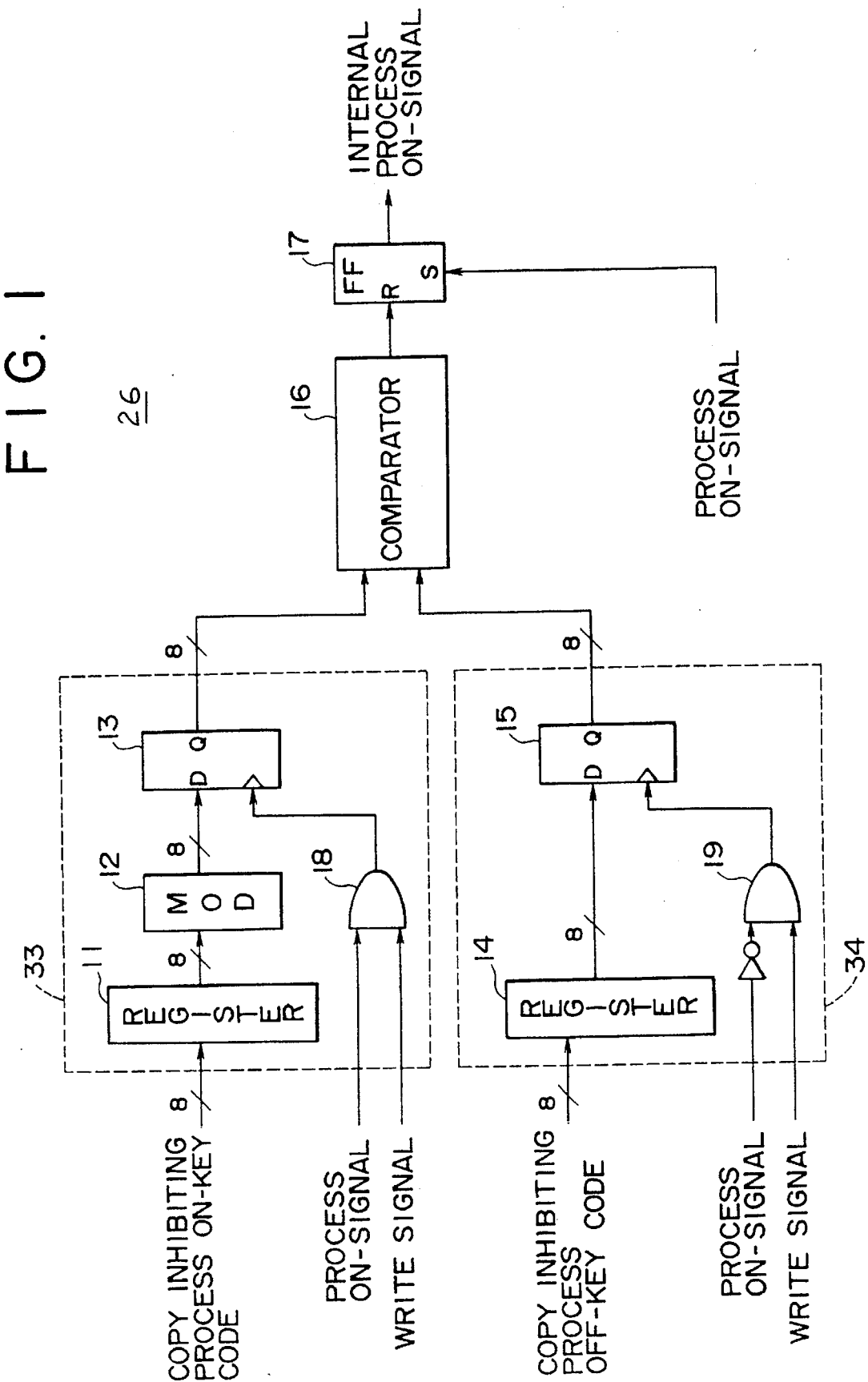

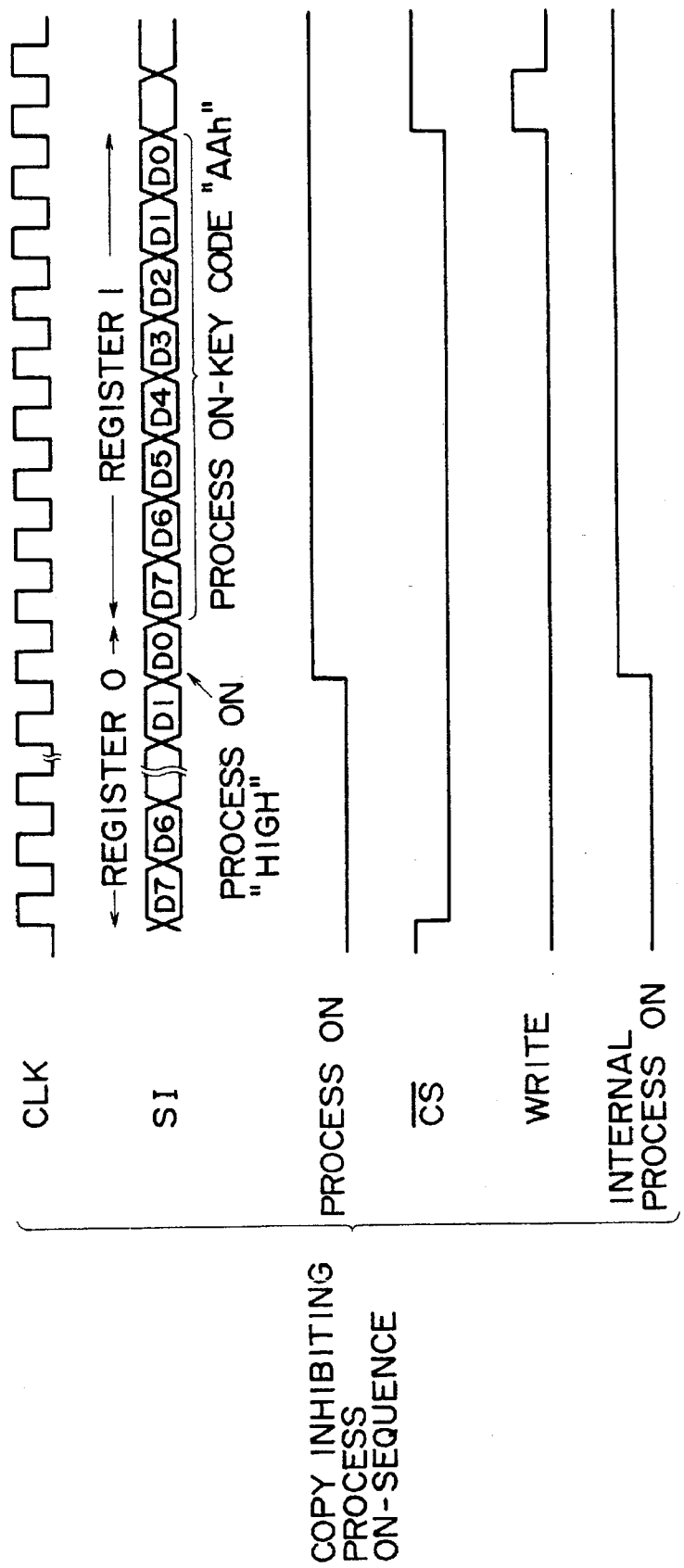

IN     1 0 1 0 1 0 1 0     AAh
↓
OUT     0 1 0 1 0 1 0 1     55h

FIG. 5

| REGISTER NO. | D7 | D6 | D5 | D4 | D3 | D2 | D1 | D0 |
|---|---|---|---|---|---|---|---|---|
| 0 | | | | | | | | ■ |
| 1 | C07 | C06 | C05 | C04 | C03 | C02 | C01 | C00 |
| ⋮ | | | | | | | | |
| 8 | | C10 | | | | | | |
| 9 | | C11 | | | | | | |
| 10 | | C12 | | | | | | |
| 11 | | C13 | | | | | | |
| 12 | | | C14 | | | | | |
| 13 | | | C15 | | | | | |
| 14 | | | C16 | | | | | |
| 15 | | | C17 | | | | | |
| 16 | | | | | | | | |

■ : PROCESS ON SIGNAL (HIGH; PROCESS ON, LOW; PROCESS OFF)

□ : COPY INHIBITING PROCESS ON-KEY CODE

▨ : COPY INHIBITING PROCESS OFF-KEY CODE

VIDEO SIGNAL PROCESSOR WITH COPY PREVENTION FUNCTION

BACKGROUND OF THE INVENTION

1. Field of the Invention

The present invention relates to a video signal processor equipped with a copy preventive function and capable of executing on/off control of such a copy preventive function.

2. Description of the Related Art

In a conventional video apparatus such as analog VTRs known heretofore, it has been customary that in the manufacture of soft tape a disturbance signal adapted to disturb the operation of an AGC circuit in a recording section of the VTR is inserted, for the purpose of protecting a copyright, on a predetermined line during a vertical blanking interval of a video signal. Due to the existence of such a disturbance signal, if the soft tape is illegally dubbed by any third person, the dubbed tape is rendered in a non-reproducible state to consequently achieve desired protection of the copyright. There is a known U.S. Pat. No. 4,631,603 regarding to this protection.

Meanwhile, wide progress has been observed of late in digital video apparatus with resultant remarkable improvements in picture quality. Since video signals in digital video apparatus are essentially superior in quality, it is demanded more often than analog video apparatuses and therefore it is desirable that an adequate circuit be incorporated to inhibit both digital-to-digital dubbing and digital-to-analog dubbing. Video compression technology for limiting the quantity of data is adopted in digital video apparatus currently available, particularly in digital VTRs and some apparatus designed to deal with digital television broadcasting, video-CD, CDI, video karaoke and so forth which have a signal format conforming with the MPEG (Motion Picture Experts Group) standard. Generally the digital video signal processed in such apparatus is composed merely of data representing the actual picture itself, and signal components relative to vertical blanking, horizontal blanking and so forth not directly related to the picture are eliminated.

Normally, each of the digital video apparatus incorporates a video signal processor therein to convert a digital video signal into an ordinary analog television signal having data of blanking intervals. Under such circumstances, there recently has been an idea to insert, in the video signal processor, the aforementioned disturbance signal into a vertical blanking interval to thereby substantially inhibit the recording, on any tape, of the analog television signal outputted from the video apparatus.

European Patent application number 0580367 published on Jan. 26, 1994, discloses a copy protection system. Unpublished Japanese patent application number 05277633 and 06040450 discloses a similar copy protection video system. Each of the above applications are owned by the assignee of the present invention and corresponding U.S. applications are still pending.

Although the above-described inhibition of any illegal video recording on tape is very much in demand, it is also desired on the other hand that the video-recording inhibited state be canceled to permit a condition where the television signal from the video apparatus is recordable on tape when properly in compliance with requirements inherent to the video apparatus. In other words, it is also desired that on/off control of the copy inhibiting process be executable freely.

One specific method for realizing such on/off control of the copy inhibiting process in the aforementioned video signal processor, may be to allocate on/off control data of 1 bit to each register. However, in employing this method, it is possible for a third person to easily find which bit in a bit stream is used for on/off control of the copy inhibiting process by monitoring and comparing the bit stream at the on-time and at the off-time of the copy inhibiting process by means of a logic analyzer or the like. Accordingly, there arises a problem that the copy inhibiting process can be illegally canceled by a third person. And even if a command for on/off control of the copy inhibiting process is composed of a plurality of bits, it is still possible to cancel the copy inhibiting process with facility in the same manner as described above.

SUMMARY OF THE INVENTION

It is an object of the present invention to provide a video signal processor which is capable of executing on/off control of a copy inhibiting process and rendering extremely difficult any illegal cancellation of the copy inhibiting process by a third person.

According to one aspect of the present invention, there is disclosed a video signal processor which comprises an obstructor for obstructing proper recording of a video signal, a memory for storing a specific code inputted at the time of enabling the obstructor and also for storing a disable request code inputted at the time of a request to disable the obstructor, and a decider having a judge means to judge the correspondence between the value of the specific code and the value of the disable request code outputted from the memory, and deciding to disable the obstructor in accordance with the output of the judge means.

In the above structure, it is preferred that the memory have a plurality of registers, and at least one of the bit components of the specific code and the disable request code are stored dispersedly in the plural registers in the memory.

It is also preferred that the obstructor has a copy inhibit signal generator means and an adder means for adding a video signal and a copy inhibit signal to each other; and the decider has first and second registers for respectively storing the specific code and the disable request code outputted from the memory and supplying these two codes to the judge means. It is further preferred that the adder means, the copy inhibit signal generator means, the first register, the second register and the judge means are incorporated in a unified integrated circuit.

The code for disabling the copy inhibit operation is different from the code inputted when the copy inhibit operation is enabled, and the correspondence between the values of the two codes is judged to decide whether the copy inhibit operation is to be disabled or not.

In the present invention, a copying operation can be inhibited immediately by turning a process on-signal to "high". To enable execution following inhibition, it is necessary to input a copy inhibiting process off-key code having a certain value in a predetermined relationship to the value of a copy inhibiting process on-key code inputted at the copy inhibit time, whereby it is rendered extremely difficult for any third person to cancel the copy inhibited state.

BRIEF DESCRIPTION OF THE DRAWINGS

FIG. 1 shows a configuration of a copy inhibit controller circuit employed in a preferred embodiment of the present invention;

FIGS. 2A and 2B are a waveform chart and a timing chart, respectively, of signals in the embodiment of FIG. 1;

FIG. 5 shows a memory map of a register group used in the embodiment of FIG. 4.

DETAILED DESCRIPTION OF THE PREFERRED EMBODIMENT

Figure 2B:
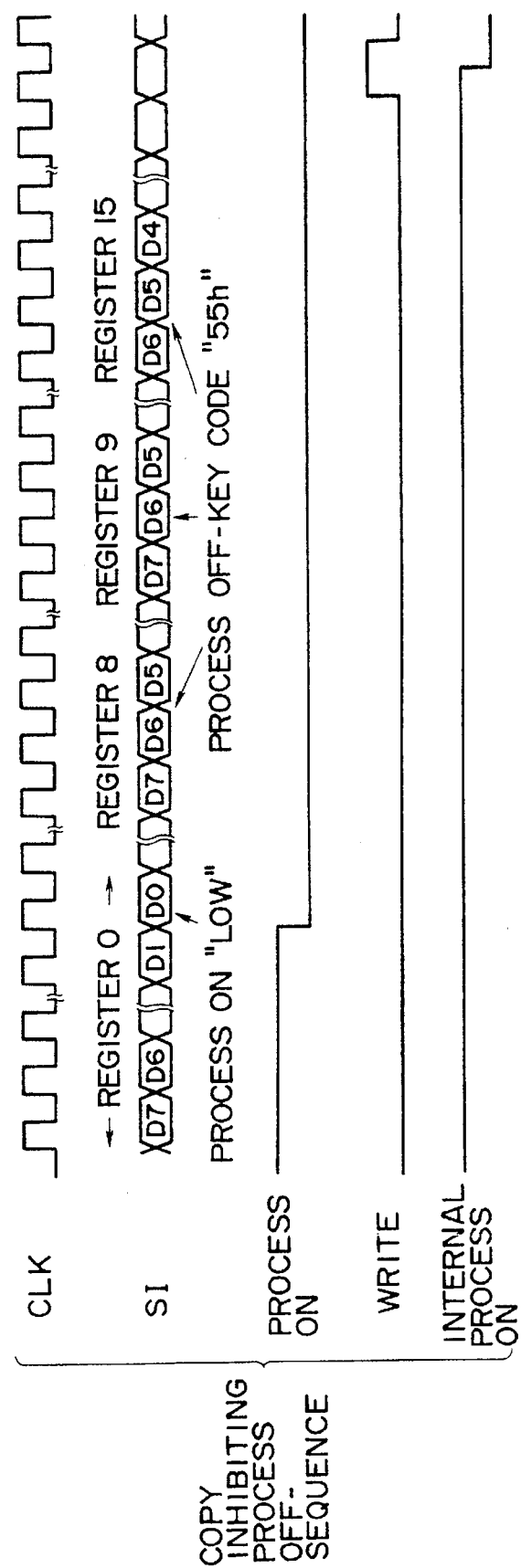

First, with reference to a circuit configuration shown in FIG. 4, a description will be given of an embodiment of the present invention which represents a video signal processor for use in a video apparatus based on the MPEG standard.

The video signal processor shown in this diagram is formed in a semiconductor integrated circuit of a single chip, wherein input video signals include a digital Y signal (DY) composed of data of an effective picture area and having a sample frequency of 13.5 MHz, and a digital R–Y signal (CR) and a digital B–Y signal (CB) composed of data of an effective picture area and each having a sample frequency of 6.75 MHz; and output signals produced from these input video signals include an analog Y signal, a chroma signal (C signal) and a composite color video signal (Y+C) with blanking interval data.

In this video signal processor, the following operation is performed. The input signals CR and CB are first fed to interpolators 10 and 21 respectively to be thereby converted into digital color difference signals having a sample frequency of 13.5 MHz, and then are fed to modulators 22 and 23 respectively to be modulated by digital signals of 13.5 MHz which are supplied from a sync signal generator 8 and correspond to a subcarrier of R–Y phase and B–Y phase. The signals thus modulated are added to each other by an adder 24, which then produces a digital chroma signal of 13.5 MHz as an output. Thereafter the digital chroma signal is fed to a burst inserter 25, where a signal of 13.5 MHz corresponding to the burst signal from the sync signal generator 8 is inserted, and the output signal of the burst inserter 25 is fed to a D-A converter 28, from which an analog chroma signal is delivered.

Meanwhile the input signal DY is fed first to a closed-caption signal inserter 1 where a closed caption signal is inserted on a predetermined line during a vertical blanking interval, and then a digital sync signal is inserted by a sync signal inserter 3. Then in a copy inhibit signal adder 4, a digital copy inhibit signal corresponding to the aforementioned disturbance signal is added in accordance with requirement so as to disturb the operation of a recording section in a VTR. Thereafter the digital Y signal outputted from the adder 4 is supplied to a D-A converter 27, from which an analog Y signal is delivered. Meanwhile the digital Y signal and the chroma signal are added to each other by an adder 5, whose output is then supplied to a D-A converter 6 which delivers an analog composite color video signal Y+C therefrom.

In this circuit configuration, a register group 7 is supplied with input data from outside, inclusive of closed caption data, data 50/60 relative to a television system (identification data relative to NTSC system, PAL system, etc.), parameter data relative to the format of a copy inhibit signal, and control data for switching on or off the copy inhibit operation. A closed caption signal generator 2 produces a digital closed caption signal of 13.5 MHz on the basis of the closed caption data and inserts this signal into the signal DY on a predetermined line during a vertical blanking interval in synchronism with a timing signal from a sync signal generator 8.

The sync signal generator 8 generates a synchronizing signal and a color subcarrier, which are prescribed by the system based on the aforementioned data relative to the television system, in the form of digital signals of 13.5 MHz, and also produces timing signals indicative of various required time points and supplies these timing signals to both the closed caption signal generator 2 and a copy inhibit signal generator 9. The sync signal generator 8 further has an input circuit for external synchronization so that, when the video signal processor of the invention is incorporated and used in a specific video apparatus, an internal sync signal synchronized with a sync signal from the video apparatus can be obtained.

The control data concerned with the copy inhibit operation and inputted to the register group 7 is supplied therethrough as a process on-signal or a key code to a copy inhibit controller 26, and when the control data is the one to turn on the copy inhibit operation, a copy inhibit signal on a predetermined line during a vertical blanking interval is outputted from the copy inhibit signal generator 9 to the adder 4 in response to the control signal outputted from the copy inhibit controller 26, whereby the copy inhibit operation is executed. Meanwhile, when the control data is the one to turn off the copy inhibit operation, the supply of the copy inhibit signal from the copy inhibit signal generator 9 to the adder 4 is interrupted to thereby cancel the copy inhibit operation.

Figure 4:
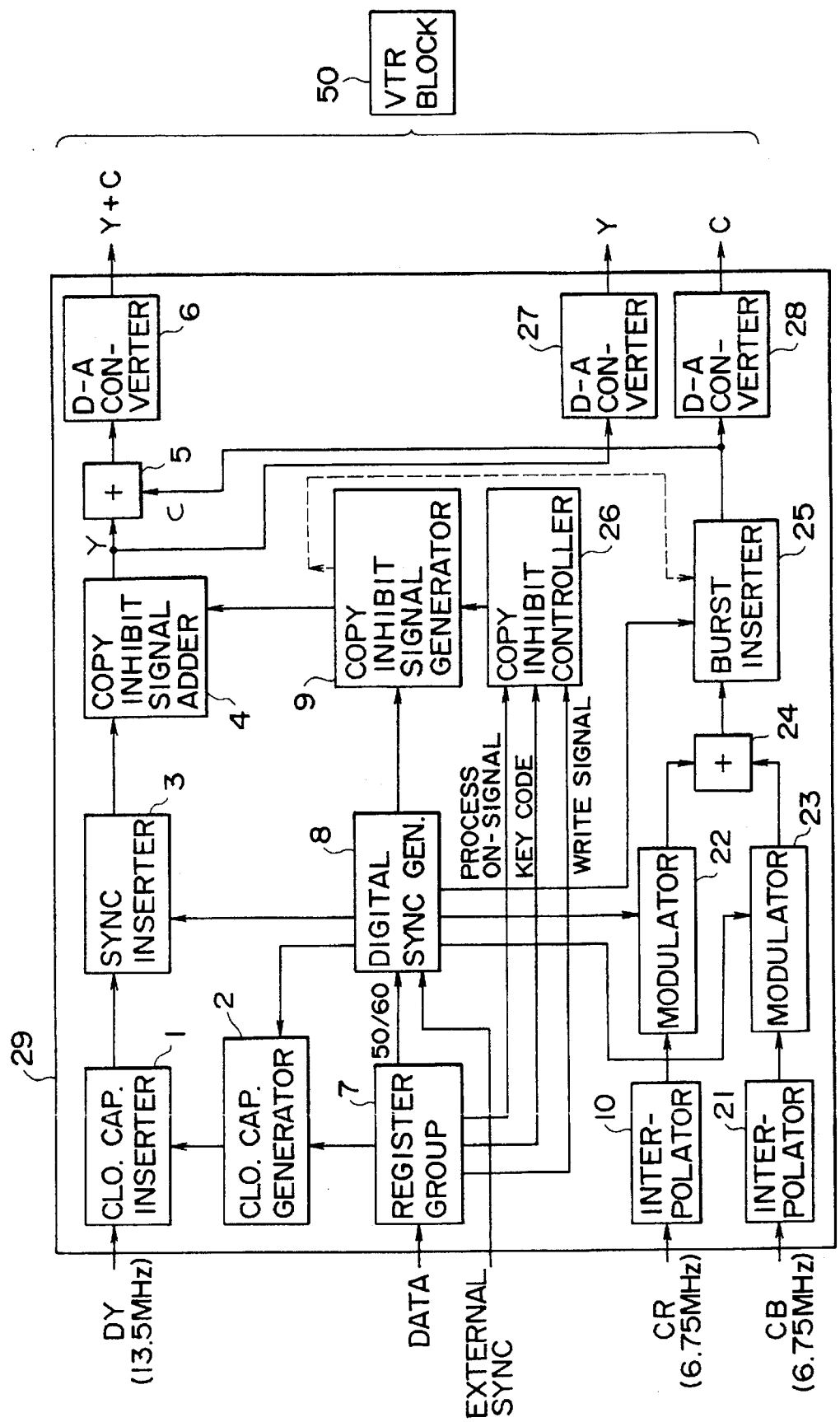
FIG. 4 shows a circuit configuration of an embodiment representing the video signal processor of the present invention.

Although not shown in FIG. 4, a parameter related to a copy inhibit signal is obtained from the register group 7 and is inputted to the copy inhibit signal generator 9, so that a copy inhibit signal of the prescribed format based on this parameter is produced in the signal generator 9. For further ensuring the copy inhibit operation with enhanced certainty, it is desirable to adopt an additional circuit configuration for disturbing the burst signal inserted in the chroma signal. An arrowed dotted line shown in this diagram denotes an exemplary configuration to meet a requirement, wherein the signal generator 9 generates, in addition to the aforementioned disturbance signal, a polarity inversion signal for inverting the polarity of the burst signal every other line, so that the value of the burst signal in a burst inserter 25 is inverted every other line by this polarity inversion signal.

Referring next to FIG. 5 and FIGS. 1 to 3, a description will be given on the copy inhibit control data stored in the register group 7, and also on the circuit configuration and the operation of the copy inhibit controller 26.

FIG. 5 shows an exemplary arrangement of the register group 7 and a composition of the copy inhibit control data stored therein. In the example of FIG. 5, the register group 7 consists of a total of seventeen 8-bit registers (i.e., register 0 to register 16). The control data is composed of a 1-bit process on-signal stored as data D0 in register 0, an 8-bit copy inhibiting process on-key code stored as data D0 to D7 in register 1, and an 8-bit copy inhibiting process off-key code stored as data D6 in registers 8 to 11 and as data D5 in registers 12 to 15.

In addition to the above, the aforementioned closed caption data, system data 50/60 and parameter data relative to the copy inhibit signal are further stored in the register group 7. However, since these data are not concerned directly with the on/off control of the copy inhibit operation which is the subject of the present invention, an explanation thereof is omitted here.

Now the copy inhibit on/off control action performed by the copy inhibit controller 26 will be described below with reference to the internal circuit configuration of the copy inhibit controller 26 shown in FIG. 1 and also to the timing charts of FIGS. 2A and 2B.

In FIG. 5, when the copy inhibit operation is to be switched on, the process on-signal inputted to the register group 7 is turned to "high", and simultaneously a predetermined 8-bit code, e.g., "AAh" (hexadecimal notation), is inputted as a process on-key code to the register group 7. Input of the data to the register group is expressed as an SI input of a copy inhibiting process on-sequence shown in FIG. 2A. Although it is expressed as serial input data in this diagram, it may be of parallel input type as well.

As the above input operations are performed, the copy inhibiting process on-key code stored in the register 1 is then stored in the register 11 which is included in an on-key code processing circuit 33 incorporated in the copy inhibit controller of FIG. 1, and the process on-signal is supplied from the register group 7 to a flip-flop 17 shown in FIG. 1. Subsequently the flip-flop 17 is set by the "high" process on-signal, so that a "high" internal process on-signal is outputted from the flip-flop 17, and a copy inhibit signal is generated from the copy inhibit signal generator 9 in FIG. 5 on the basis of such output signal to thereby execute the copy inhibit operation.

The copy inhibiting process on-key code stored in the register 11 is supplied via a modulator 12 to a latch circuit 13. Meanwhile, an AND output obtained from the process on-signal and a write signal is supplied to a clock input terminal of the latch circuit 13. More specifically, when both the process on-signal and the write signal are "high", the operation of the latch circuit 13 is executed. As shown in the copy inhibiting process on-sequence of FIG. 2A, the write signal is produced on the basis of a chip select signal CS in synchronism with the input end time of the copy inhibiting process on-key code to the register group 7.

Figure 3:
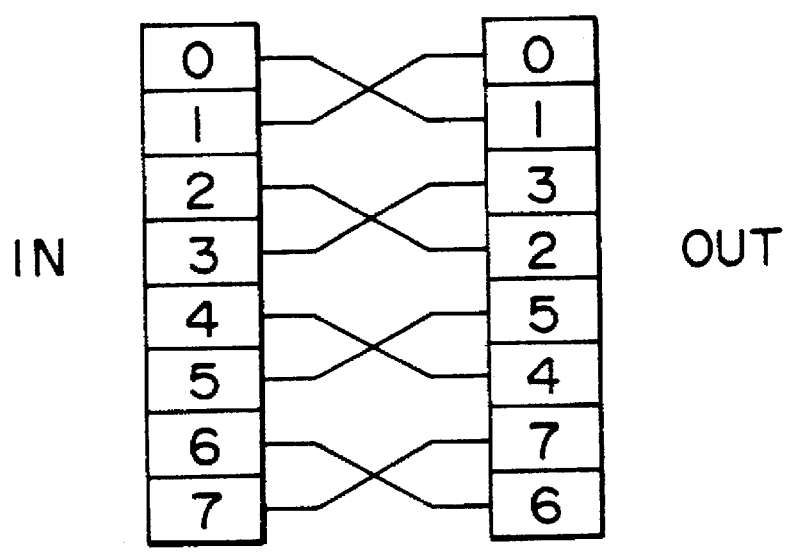
FIG. 3 illustrates an operation mode of a modulator circuit.

The signal latched by the latch circuit 13 is used as a hidden key code when switching off the copy inhibit operation. FIG. 3 illustrates an exemplary mode of conversion performed by the modulator 12. This diagram represents an example of converting the copy inhibit on-key code "AAh" into 55h by replacing odd and even bits. However, the operation is not limited to this example alone and may be performed in any other adequate mode of conversion. Essentially, the requisite is to scramble the input signal by some means.

When the copy inhibit operation is to be switched off, the process on-signal inputted to the register group 7 is turned to "low", and simultaneously the hidden key code is inputted as a copy inhibiting process off-key code (see the SI input in the copy inhibiting process off-sequence shown in FIG. 2B). As a result, the copy inhibiting process off-key code inputted to the register group 7 is written in the register 14 included in an off-key code processing circuit 34 shown in FIG. 1. Meanwhile, the AND circuit 19 is supplied with an inverted signal ("high") of the process on-signal and a write signal (see the copy inhibiting process off-sequence shown in FIG. 2B) generated in synchronism with the end time of the data input to register 15 in the register group 7, and then the copy inhibiting process off-key code is latched by the latch circuit 15 when the write signal is turned to "high".

A comparator 16 shown in FIG. 1 compares the outputs of the latch circuits 13 and 15 with each other and produces a coincidence signal when a coincidence is attained between the two latch outputs. A flip-flop 17 is reset by this coincidence signal, and the internal process on-signal is turned to "low", so that generation of the copy inhibit signal in the copy inhibit signal generator 9 is brought to a halt to thereby cancel the copy inhibit operation.

As obvious from the description given hereinabove, the copy inhibit operation can be immediately executed merely by turning the process on-signal to "high" and inputting the same to the register group. However, when canceling the copy inhibited state, it is necessary to input to the register group the copy inhibiting process off-key code which is obtained by modulating (scrambling) the process on-key code inputted previously for switching on the copy inhibit operation. Thus, due to the necessity of using two kinds of different codes to cancel the copy inhibit operation, it is extremely difficult for any third person to illegally cancel the copy inhibited state.

The copy inhibiting process off-key code for such cancellation needs to be inputted dispersedly in the input bit stream to the register group 7, so that illegal cancellation by any third person is difficult from this point of view as well. Although in the above embodiment the copy inhibiting process off-key code is dispersed in the bit stream, it may be modified in such a manner that the copy inhibiting process on-key code is also dispersed, or both the on-key code and the off-key code are dispersed.

In the configuration of FIG. 1, the modulator circuit is incorporated in the copy inhibiting process on-key code processing circuit. However, it may be so modified that the modulator circuit is incorporated in the off-key code processing circuit. In another modification, the modulator circuit may be incorporated in each of the on-key and off-key code processing circuits. In this case, the modulation modes of the two modulator circuits need to be mutually different.

Since the whole circuit configuration of the embodiment shown in FIG. 4 is formed in an integrated circuit of a single chip, it is impossible for any third person to find out the hidden key code, or to interrupt the feed path of the copy inhibit signal to the adder 4.

And when any third person is permitted to copy by the copyright holder, desired copying is rendered immediately possible by inputting the copy inhibiting process off-key code supplied by the copyright holder.

Although the video signal processing circuit described above consists of a digital one, an analog processing circuit may be employed as well. In this case, the input video signal in FIG. 4 is composed of analog Y and color difference signals of an effective scanning period, and the circuits 1 to 5, 8 and 9, and 22 to 25 are analog ones. The D-A converters 6, 27, 28 and the interpolators 10 and 21 are not required. As for the register group 7 and the copy inhibit controller 26, those shown in FIGS. 5 and 1 may be used respectively.

The video signals (Y+C, Y, C) outputted from the video signal processor 29 are supplied to a VTR block 50. As described already, the video signal thus supplied contains a copy inhibit signal added thereto in accordance with the video signals, and is so controlled in the VTR block that no recording is performed if the copy inhibit signal is detected.

Figure 6:
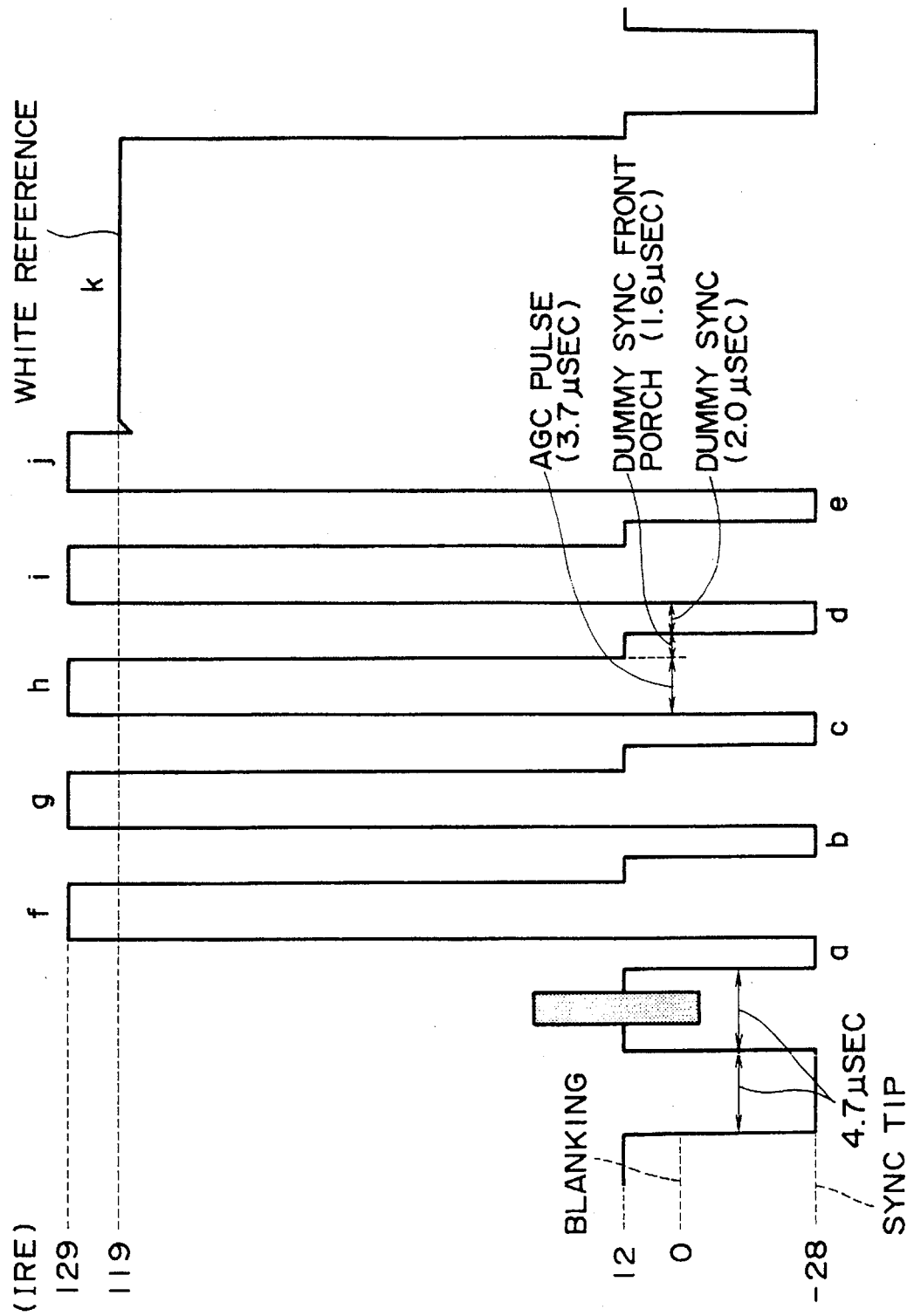
FIG. 6 shows a video signal having dummy sync pulses supplied to a VTR block.

FIG. 6 shows a video signal (Y+C) supplied to the VTR block 50. As shown, dummy sync pulses a, b, c, d and e are inserted in portions where the essential H (horizontal) sync signal is not wanted, so as to disturb a servo circuit in the recording section of the VTR. And simultaneously, AGC (automatic gain control) pulses f, g, h, i and j are also inserted to change the level analogously. There are various modes including a pulsing mode where the pulse signal level is varied between certain levels (the signal level is changed approximately between 40% and 70% at a rate of once or twice per second), and a still mode where the level is kept still at the maximum of 129 IRE or the pedestal level of 12 IRE (the signal level is lower by approximately 33% than the normal level). In FIG. 6, k denotes a white reference fixed normally at 119 IRE. However, this reference is also changeable from 119 IRE to the pedestal level of 12 IRE by manipulation. Consequently, the recording signal level in the VTR varies approximately from 30% to 70% of a normal signal level, and even if a recording operation may be performed, the resultant pictures are disordered and therefore proper recording can be substantially prevented.

Finally, regarding a concrete example of an application, a brief description will be given on an exemplary case of employing the video signal processor of the present invention as a copy inhibit means in a digital television broadcast receiver.

In this case, when a copyrighted program is broadcast from a broadcasting station, a process on-signal of a "high" level and a copy inhibiting process on-key code are also transmitted as incidental data in addition to digital video data. And in a receiver, the process on-signal and the copy inhibiting process on-key code included in the transmitted incidental data are inputted to the register group 7 of the video signal processor incorporated in the receiver, whereby the copy inhibit signal is inserted into the television signal.

Meanwhile, when a free program without any copyright is broadcast, a process on-signal of a "low" level and a copy inhibiting process off-key code are transmitted to thereby halt generation of a copy inhibit signal in the video signal processor.

A data input unit is constituted such that, if the channel being received is changed by a user during the operation of the receiver, the channel change is detected, and the copy inhibiting process off-key code is obtained automatically through computation of the copy inhibiting process on-key code and is inputted to the register group 7. In this manner, whenever any channel is changed in the receiver, the receiver is selectively switched over to a copy allowed state. And when the program being broadcast in the changed channel is a copyrighted one, the receiver is switched again to the copy inhibited state since the process on-signal is being transmitted.

What is claimed is:

1. A video signal processor comprising:

receiving means for receiving a digital video signal;

video signal transformation means for transforming the digital video signal to a standard analog television signal;

inhibitor means for inhibiting proper recording of the standard analog television signal;

a memory for storing a specific code inputted when enabling the inhibitor means, and also for storing a disable request code inputted in response to a request for disabling the inhibitor means;

means for judging the correspondence between the specific code and the disable request code outputted from the memory; and means for deciding an operation to disable the inhibitor means in accordance with an output from the means for judging, wherein the memory includes a plurality of registers, and at least one of the bit components of the specific code and the disable request code are stored dispersedly in the plurality of registers in the memory, and wherein the inhibitor means includes copy inhibit signal generator means and adder means for adding the standard analog television signal and the copy inhibit signal to each other; the means for deciding includes first and second registers for respectively storing the specific code and the disable request code outputted from the memory; and all of the adder means, copy inhibit signal generator means, first register, second register and means for judging are unified to form an integrated circuit.

2. The video signal processor according to claim 1, wherein the integrated circuit includes a digital-to-analog converter for converting the digital video signal into the standard analog television signal such that the standard analog television signal outputted from the converter contains the copy inhibit signal combined therewith.

3. The video signal processor according to claim 2, wherein the copy inhibit signal combined with the standard analog television signal has a period in which the signal level thereof is approximately equal to a sync tip level in the video signal period.

4. The video signal processor according to claim 1, wherein the standard analog television signal is varied to a predetermined signal level.

5. The video signal processor according to claim 4, wherein the standard analog television signal is varied to a predetermined signal level cyclically at every predetermined time interval.

6. The video signal processor according to claim 5, wherein the predetermined signal level ranges approximately from 30 to 70 percent of a normal signal level.

7. A video signal processor comprising:

receiving means for receiving a digital video signal and recording inhibit information;

video signal transformation means for transforming the digital video signal to a standard analog television signal;

supplementing means for inserting a disturbance signal into a vertical blanking period of the standard analog television signal, said disturbance signal being adapted to inhibit recording of a video recording apparatus;

a memory for storing a first key code when the recording inhibit information represents that proper recording of the standard analog television signal is inhibited, means for comparing the stored first key code and a second key code when the recording inhibit information represents that proper recording of the standard analog television signal is authorized, and means for disabling the supplementing means in response to correspondence of the comparing means, wherein the memory includes a plurality of registers, and at least one of the bit components of the first key code and the second code are stored dispersedly in the plurality of registers in the memory, and wherein the supplementing means includes copy inhibit signal generator means and adder means for adding the standard analog television signal and the copy inhibit signal to each other, the means for comparing includes first and second registers for respectively storing the specific code and the disable request code outputted from the memory; and all of the adder means, copy inhibit signal generator means, first register, second register and means for comparing are unified to form an integrated circuit.

8. The video signal processor according to claim 7, wherein the digital video signal comprises a digital luminance signal and digital color difference signals.

9. The video signal processor according to claim 8, wherein the video signal transformation means comprises:

a synchronizing signal inserter for supplementing digital synchronizing signals to the digital luminance signal;

modulator means for modulating the digital color difference signals;

adder means for adding modulated digital color difference signals to each other and outputting a digital color signal;

a color burst signal inserter for supplementing a color burst signal to the digital color signal; and an analog-to-digital converter for converting an output signal of the synchronizing signal inserter and color burst signal inserter.

10. The video signal processor according to claim 7, further comprising:

key code modulating means for modulating the first key code;

wherein the memory means stores the modulated first key code.

11. The video signal processor according to claim 7, further comprising:

key code modulating means for modulating a second key code;

wherein the comparing means compares the stored first key code and modulated second key code.

12. The video signal processor according to claim 7, further comprising:

first key code modulating means for modulating the first key code; and second key code modulating means for modulating the second key code;

wherein the memory means stores the modulated first key code and the comparing means compares the stored first key code and the modulated second key code.

13. A compressed-digital video signal receiver apparatus comprising:

receiving means for receiving a compressed-digital video signal, recording inhibit information and key code information;

decoder means for decoding the received compressed-video signal;

video signal transformation means for transforming the decoded digital video signal to a standard analog television signal;

supplementing means for inserting a disturbance signal into a vertical blanking period of the standard analog television signal, said disturbance signal being adapted to inhibit recording of a video recording apparatus;

a memory for storing a first key code when the recording inhibit information represents that proper recording of the standard analog television signal is inhibited, wherein the memory includes a plurality of registers, and at least one of the bit components of the recording inhibit information and the key code information are stored dispersedly in the plurality of registers in the memory, and wherein the supplementing means includes copy inhibit signal generator means and adder means for adding the standard analog television signal and the copy inhibit signal to each other; and means for deciding including first and second registers for respectively storing the recording inhibit information and the key code information outputted from the memory; and all of the adder means, copy inhibit signal generator means, first register, second register and means for deciding are unified to form an integrated circuit.

* * * * *